(12) United States Patent
Hackett et al.

(10) Patent No.: US 6,819,668 B1
(45) Date of Patent: *Nov. 16, 2004

(54) TRAIL MANAGEMENT IN A COMMUNICATIONS NETWORK

(75) Inventors: Trevor Malcolm Hackett, London (GB); Nigel Davis, Middx (GB)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,374

(22) Filed: Dec. 23, 1998

(30) Foreign Application Priority Data

Sep. 29, 1998 (GB) .............................................. 9821133
Oct. 30, 1998 (GB) .............................................. 9823685

(51) Int. Cl.[7] .......................... H04L 12/28; H04L 12/50
(52) U.S. Cl. ....................... 370/360; 370/468; 370/907
(58) Field of Search ................................ 370/254–288, 370/389, 390, 391, 392, 397, 358, 360, 386, 399, 400, 401, 468, 474, 477, 535–539, 907; 709/201–203

(56) References Cited

U.S. PATENT DOCUMENTS

| | | | |
|---|---|---|---|
| 5,168,494 A | * 12/1992 | Mueller | 370/535 |
| 5,764,740 A | 6/1998 | Holender | 379/112 |
| 5,784,380 A | * 7/1998 | Kuwahara | 370/509 |
| 5,936,951 A | * 8/1999 | Andersson et al. | 370/351 |
| 5,987,027 A | * 11/1999 | Park et al. | 370/360 |
| 6,223,219 B1 | * 4/2001 | Uniacke et al. | 709/223 |
| 6,266,345 B1 | * 7/2001 | Huang | 370/468 |

FOREIGN PATENT DOCUMENTS

| | | |
|---|---|---|
| EP | 0 635 958 | 1/1995 |
| GB | 2 325 374 | 11/1998 |
| WO | WO 97/23101 | 6/1997 |

* cited by examiner

*Primary Examiner*—John Pezzlo
*Assistant Examiner*—Saba Tsegaye
(74) *Attorney, Agent, or Firm*—Barnes & Thornburg LLP

(57) ABSTRACT

Communications trails on a network can be provisioned by users using a trail manager. In a hierarchically-layered connection-management domain, when a trial (50) between trial termination points having respective adaptation capabilities is provisioned, client links (52,54,56) within the intersection of those adaptation capabilities are created. Further trails may then be provisioned in channels within those client links. Channel usage information (58,60,62) within the client links is recorded to indicate current channel usage and this information is updated by the trail manager whenever a trial using a channel is added or deleted. In a hierarchically-layered domain, channels within client-links corresponding to different adaptation capabilities, such as different data rates, may overlap and so when channel-usage information in one client link is updated, channel-usage information in other client links is also considered and updated as appropriate.

19 Claims, 9 Drawing Sheets

TRAIL MANAGEMENT IN A COMMUNICATIONS NETWORK

The invention relates to a method and apparatus for trail management in a communications network, and in particular for controlling resource availability in server trails. In particular aspects the invention relates to the modelling and determination of bandwidth resource availability and conflict determination in a multi-layered connectivity managed domain.

This invention finds application in a very wide range of communications systems and data transport networks. These include, for example, any multi-layer connection-management system or any ITU-T (International Telecommunication Union) G.805 or G.803 recommendation, including ATM (Asynchronous Transfer Mode), SDH (Synchronous Digital Hierarchy) or PDH (Pleisiosynchronous Digital Hierarchy)/Asynchronous (e.g. 34 Mbs$^{-1}$/45 Mbs$^{-1}$) systems as well as optical layers, 64 kbs$^{-1}$ (DSD, ED), frame relay or IP (Internet Protocol) systems. Although the invention is therefore very widely applicable, it will be described herein by way of example in the context of SDH systems.

ITU-T Recommendation G.803 "Architectures of Transport Networks Based on the Synchronous Digital Hierarchy (SDH)" of 03/93 and ITU-T Draft Recommendation G.805 "Generic Functional Architecture of Transport Networks" are incorporated herein by reference.

The SONET (Synchronous Optical NETworks) and SDH (Synchronous Digital Hierarchy) standards, which were set up respectively as a US standard and a CCITT recommendation, both employ a synchronous transfer mode (STM) which offers a large number of communications channels of fixed capacity but allows flexibility in the mix of bit rates which it can transfer.

STM uses the concept of virtual containers (VCs). A container can be handled as a unit, independently of its content, by a number of network elements such as repeaters and higher order multiplexers. Such a virtual container, that is, a number of bytes reappearing at regular intervals (125 μs for STM-1), is transported in a slightly larger synchronous transport module (see FIG. 1). This module consists of 9 rows and, in the case of STM-1 (corresponding to SONET level STS-3), of 270 columns of octets.

In addition to the virtual container the module contains the information needed at regenerators and multiplexers in a Regenerator Section OverHead (RSOH) field and a Multiplexer Section OverHead (MSOH) field. The virtual container itself contains a Path OverHead (POH) field, which is only analysed by the equipment at the end of a path or trail through the network, where demultiplexing of the virtual container may be required.

The virtual container of the type VC-4 fits in the so-called Administrative Unit (AU-4) of the STM-1. The VC-4 container can also be filled with smaller types of containers, for instance, by three containers of the type VC-3, each consisting of 9 rows and 85 columns of octets. In that case the VC-4 will carry some additional administrative information regarding its content, in the form of a Tributary Unit Group (TUG-3). This decomposition process can go further, by dividing the VC-4 container into smaller containers of the types VC-2, and finally VC-1. The VC-1 has two versions; the VC-11 for 1.5 Mbit/s signals and the VC-12 mainly intended for 2 Mbit/s signals. This SDH concept allows the transfer of a large range of bit rates, including the bit rate that is chosen for handling ATM, 155.520 Mbit/s.

Data is transported across a network along a predefined client trail of a predetermined data rate supported by a predefined server trail. A trail comprises a series of link connections across links at a certain hierarchical layer of the network joined by cross-connections (subnetwork connections) within network elements (or other subnetworks) in the layer of concern.

The SDH/SONET hierarchies suggest the possibility of several different client trails, which may be of different rates, being set up within a server trail. For example, a VC4 server trail may in principle carry a VC3 client trail as well as seven VC2 client trails and 21 VC12 client trails between the trail termination points.

In this context, trail is used as a generalised term for path, circuit, section, line etc. in any connection-oriented system. The single general term trail will be used herein in this way although different specific terms may be used in different systems at different hierarchical layers. This generalised use of the term trail is in line with the definitions in ITU-T G.803. Similarly, the term trail manager is used herein to encompass any connection topology management system.

A trail is generally bidirectional and may join only two trail termination points. However trails may have much more complex topologies and join more than two termination points, optionally including multiple sources and/or multiple destinations. For example a trail for broadcast signalling may be terminated by one or two sources and many destinations.

On a network, each trail may be of any requested bandwidth, or data rate, depending on the required application and may be set up (added) or torn down (deleted) at any time. A problem therefore arises, which is how to keep an accurate map of the trails and the resource availability on the network, particularly from the point of view of the individual layers of the network architecture. This problem becomes more severe if a network contains more than one trail manager or connection manager, particularly if those managers have different views of the network at any time. Each manager can then set up trails which may conflict in their use of lower-level network bandwidth.

Although discussed above with reference to SONET and SDH standards, the same problem of resource availability and resulting conflict between entities on a network may arise in any multi-layer connection-management domain.

The invention provides in its various aspects a method and apparatus for managing trails as defined in the appended independent claims, to which reference should now be made. Preferred or advantageous features are defined in dependent subclaims.

The invention may thus advantageously provide a method and apparatus for determining resource availability and/or identifying conflicts between entities claiming resources in any system in which data are carried along trails between trail termination points and the adaptation capabilities at each end of a trail have an intersection. The invention may advantageously identify conflicts between trails arising from the allocation of, or claims for, resources. Such conflicts may arise if the intersections between the adaptation capabilities at each end of two trails are identical or overlap and the trails are allocated, or claim, identical or overlapping resources. Conflicts may arise at any point along a trail or at a termination point of a trail. For example, two trails conflict if at some point in their paths they use the same link capacity in the same layer or peer layer.

In a first aspect the invention may thus advantageously provide a method and apparatus for preventing an operator on a network from provisioning two conflicting trails across the network.

The invention may in a second preferred aspect provide a method and apparatus for supplying an operator on a network with sufficient information to allow identification and coordinated resolution of conflicts between his requirements for network connections (trails) and resource availability.

Thus, in a preferred embodiment, the invention may find particular application in a SONET/SDH system in which, for example, a VC4 resource may be decomposed, or split, into a mixture of VC3, VC2 and VC1. The TUG-structured payload of SONET/SDH is an example of a system in which the adaptation capabilities at each end of a trail may have an intersection.

Preferred aspects of the invention may allow the addition and/or removal of trails utilising resources, while advantageously monitoring conflicts between trails.

Advantageously, the invention in its various aspects may provide a generic approach to the determination of resource availability and conflict within any multi-layer connection-management domain as described above.

Specific embodiments and the best mode of the invention will now be described by way of example, with reference to the drawings, in which.

Figure 2:
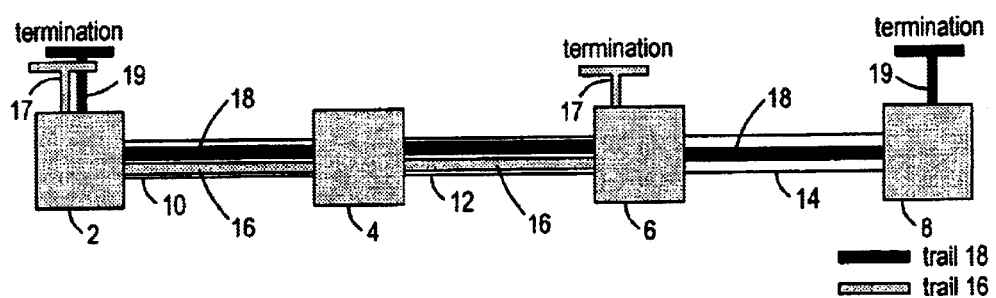
FIG. 2 is a diagram of a portion of a network comprising network elements joined by connection elements, showing two trails.

FIG. 2 illustrates four network elements (NEs) 2, 4, 6, 8 joined in series by links 10, 12, 14 forming part of a network. Entities connected to the NEs communicate with each other via client trails within server trails across the network and in FIG. 2 two server trails 16, 18 are shown. One server trail 16 links NEs 2 and 6 and thus has terminations 17 within those NEs. The other server trails 18 links NEs 2 and 8 and thus has terminations 19 within those NEs.

The description herein concentrates on a NE solution although this can clearly be generalised to any subnetwork solution, in which subnetworks are joined by links as represented in ITU-T G.805.

In the preferred embodiments described herein, the invention provides various means for managing connections between entities joined by such server trails.

Figure 1:
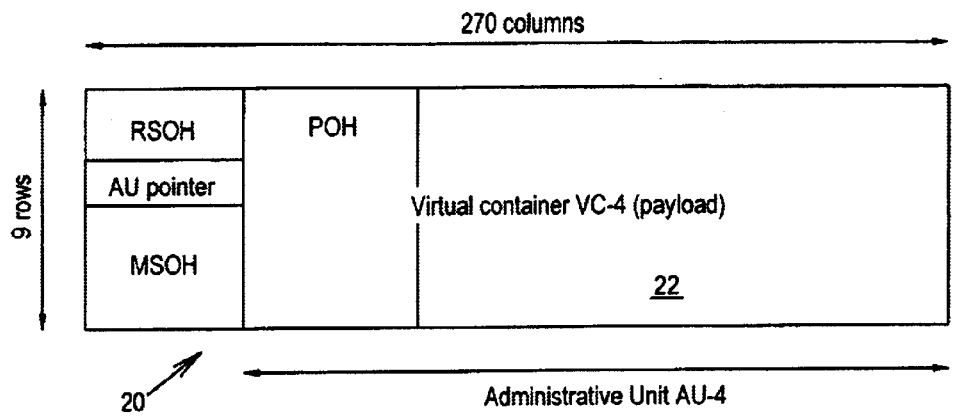
FIG. 1 is a schematic diagram of a prior art synchronous transport module of the type STM-1.

The specific embodiments will be described in the context of the SONET/SDH hierarchy discussed in the introduction above. FIG. 1 has already been described and shows the structure of an AU-4 administrative unit 20 which can carry a VC-4 (virtual container) payload 22. The VC4 payload can be decomposed into smaller elements in a hierarchical manner. Each VC4 can carry three VC3 elements, twenty one VC2 elements or sixty three VC12 elements or combinations of these elements. (The VC2 elements may in different systems be decomposed into either type VC11 or VC12 elements; only type VC12 will be described further herein, but references to VC12 may be replaced by references to VC11 without loss of generality).

Figure 3:
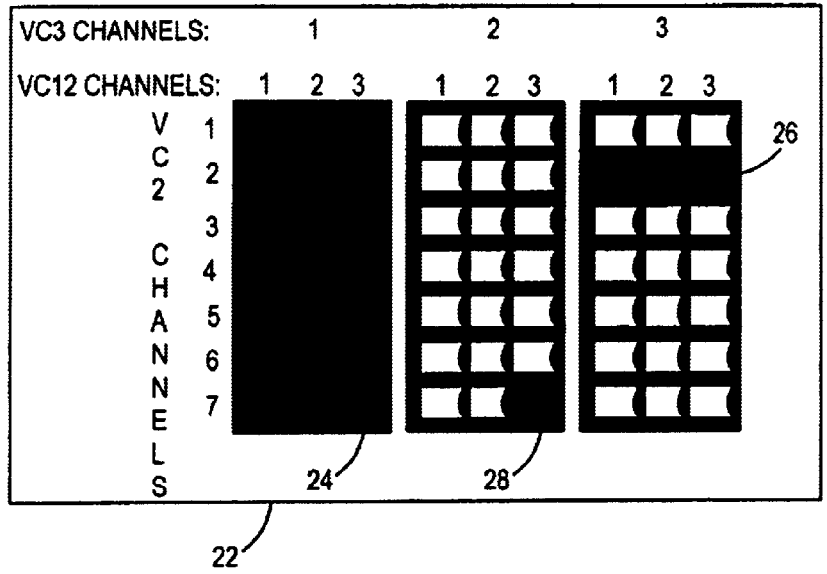
FIG. 3 illustrates the decomposition of the VC4 channel into VC3, VC2 and VC12 channels.

The decomposition of a VC4 payload can be illustrated in terms of decompositional shapes, as illustrated in FIG. 3. FIG. 3 shows a VC4 payload 22 divided into one VC3, 24, which is shaded, seven VC2s, one of which 26 is shaded and 21 VC12s, one of which 28 is shaded.

VC3, VC2 and VC12 links occupy the same hierarchical level and so are termed peer links. VC4 links occupy a higher hierarchical level.

Entities on a network communicate via trails, termed client trails, set up within higher-level trails, termed server trails, across the network between the desired termination points. The server trail to client trail relationship only defines the relationship between a particular pair of trails in a hierarchy of trails. A server trail may, for example, be in turn a client trail of a higher-level trail.

The bandwidth of a trail is defined in terms of the virtual container sizes, so a trail may require a VC4 channel or a VC2 channel for example. Each trail may pass across more than one link in its layer, provided by its server layers, as illustrated in FIG. 2. However, if two or more trails are set up between different NEs, each link may carry different trails or combinations of trails. For example, link 10 in FIG. 2 carries trail 16 and trail 18 while link 14 only carries trail 18. It can easily be seen, therefore, that when a new trail or client trail is created, conflict with the bandwidth of existing server or client trails must be avoided in each link.

Creating Trails

When a user on a network wishes to communicate with another entity, a request is sent to a trail manager to provision a trail between them. A server trail may already define a route of a certain bandwidth between the entities, such as a VC4 trail. If no server trail between the entities exists, the user may create one via a user interface (UI). Client trails of lower bandwidth for carrying data or messages between the entities may then be added or deleted within the server trail.

A trail usually crosses a plurality of links and needs to be defined in each link. This is carried out by a trail manager with reference to a network trail database which stores details of the trail within the links in terms of link connections, where a link represents the capability to support link connections, and therefore trails, at a given hierarchical layer between the NEs (subnetworks) at either end of the link. For example, for a VC4 trail, a VC4 link connection is placed in each relevant VC4 link to record in the database the relevant aspect of the path of that trail across the network.

According to an embodiment of the invention, a trail may be provisioned using the following mechanism.

Y-Ripple or Up-Ripple—Add

When a trail is created between two or more trail termination points, for example by a user via a UI, information associated with each termination point (which is known by the network, for example being stored in the network trail database) is considered to determine the communications capabilities of the termination points. In a multilayer system these are termed adaptation capabilities, defining the ability of each termination point to send and receive data in different layers of the system or at different rates. For example in SONET/SDH, the decomposition of virtual containers into smaller virtual containers is an adaptation process, the communications layers being adaptation layers.

Consider for example the creation of a trail between two termination points. If one termination point is a VC4 termination point which can support VC3, VC2 and VC12 capabilities, and the other is a VC4 termination point which can support VC3 and VC12 adaptation capabilities, the intersection of the adaptation capabilities which may be used for trails between the termination points is VC3 and VC12.

The user can then provision a VC4 trail between the termination points to act as a server trail for lower-rate client trails. When the VC4 trail is created, a create-client-links mechanism creates links for the intersection of the termination point capabilities, i.e. in this example it creates VC3 and VC12 client links for the VC4 server trail. Links are always clients of a trail.

Once client links have been established, lower-rate (VC3 and/or VC12) trails can be placed within (carried by) the higher-rate (VC4) server trail.

When a trail is set up which is a client of the VC4, connections are put in the appropriate VC3 and/or VC12 links to record details of the client trail.

Each client link models channel availability from the perspective of the link rate (i.e. VC3, VC2 or VC12).

Figure 4:
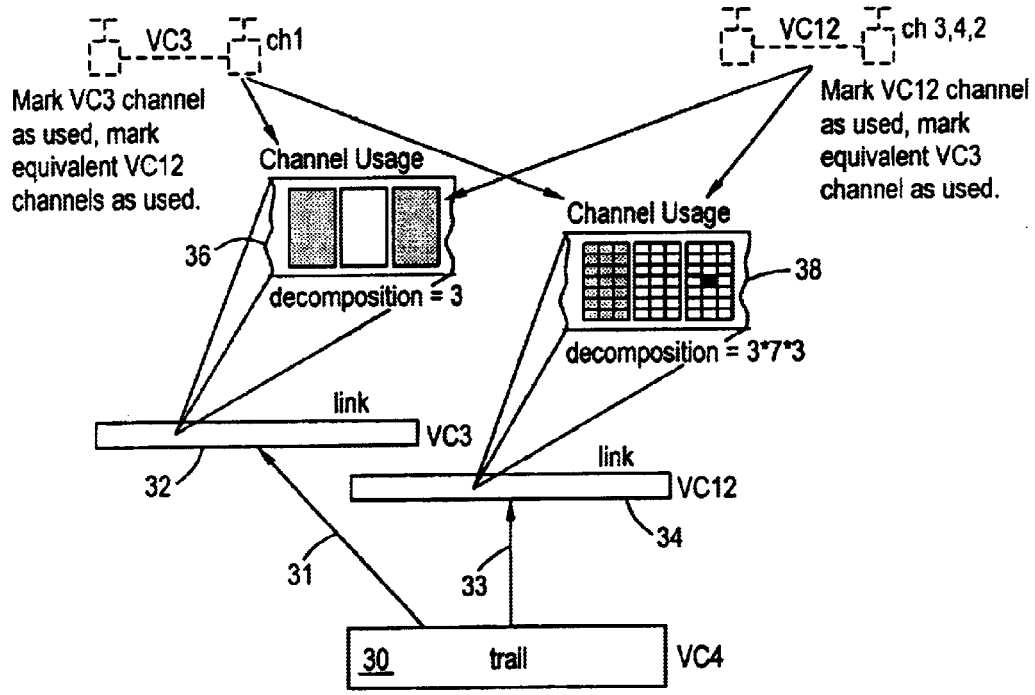
FIG. 4 illustrates the channel usage information for a VC3 plus VC12 client trail with a VC4 server trail.

Each client link thus holds a representation of channel usage and therefore of channel availability. This is illustrated in FIG. 4 for the case in which client trails comprising a VC3 channel and a VC12 channel are set up within a VC4 server trail 30. Records of channel usage are kept in the VC3 link 32 and the VC12 link 34. The channel usage information in the VC3 and VC12 links is shown in graphical, or map, form 36, 38 in FIG. 4.

The graphical form of the channel usage information in each link may be explained further with reference to FIG. 3, in which a VC4 channel and its decomposed substructure is shown. Thus, the VC4 can be divided into three blocks of VC3 capacity (numbered 1 to 3) which may be used as VC3 channels. Alternatively, any VC3 block may be divided into seven blocks of VC2 capacity (numbered 1 to 7) which may be used as VC2 channels. Finally, any VC2 block may be further divided into three blocks of VC12 capacity (numbered 1 to 3) which may be used as VC12 channels. A corresponding coordinate reference can then identify each channel uniquely (e.g. VC3(1), VC2(3,2), VC12(2,7,3) as shaded in FIG. 3.

It should be noted that although the bandwidth of a VC3 channel is equivalent to the bandwidth of seven VC2 channels or 21 VC12 channels, VC3, VC2 and VC12 are peer links and are decompositions of VC4, not of each other.

FIG. 4 shows channel usage information in each link in similar graphical form. VC3 channel (1) and VC12 channel (3,4,2) are assigned to the respective client trails and so the VC3 link 32 marks VC3 channel (1) as being in use and the VC12 link 34 marks VC12 channel (3,4,2) as being in use. However, the VC3 link also marks VC3 channel (3) because the VC12 channel assigned to the trail falls within VC3 channel (3). This prevents VC3 channel (3) being assigned by the trail manager to another client trail, which would conflict with VC12 channel (3,4,2) in the existing client trail. Similarly, the VC12 link marks all VC12 channels equivalent to VC3 channel (1) as used, to prevent any VC12 channels within that VC3 channel being assigned to other trails.

At the top of FIG. 4 are shown in phantom the channels of the client trail in use on the client links being described. These are VC3 channel (1) and VC12 channel (3,4,2).

It should be noted that if a trail is created within one of the client links (e.g. a VC12 trail in the VC12 client link), then the create-client-links mechanism creates any further appropriate client links for the new trail (e.g. a 2 Mbs$^{-1}$ client link). Any such further client links must, of course, fall within the intersection of the adaptation capabilities of the trail termination points. In this manner a tree of links is created, triggered by the creation of trails.

It can be seen that the Add Y-ripple mechanism creates client links for a trail without regard to any conflicting claims for the bandwidth in those client links from other trails. By creating all possible client links for a higher-rate trail the mechanism makes the optimistic assumption that all of the bandwidth of those links may be available for trails within that higher-rate trail. Thus, when a trail is created, each client link from its own perspective believes it has all the bandwidth of the client link available to it. For example, if VC3 and VC12 client links for a VC4 trail are created, the VC3 client link believes it has three VC3 channels available and the VC12 client link believes it has 63 VC12 channels available. It is only when another link claims bandwidth for its client trail (e.g. when the VC3 link claims a VC3 channel) that other links see their bandwidth availability erode (e.g. the VC12 link loses the 21 channels equivalent to the claimed VC3 channel). Further competition for resources may also arise from claims for bandwidth by other users on the network.

After creating client links in this way it is therefore advantageous to implement conflict-identification and conflict-resolution measures to enable non-conflicting trails to be set up and used. Examples of such mechanisms embodying aspects of the present invention are described below; these are termed V-ripple mechanisms.

Y-Ripple or Up-Ripple—Delete

When a trail is deleted, it may be possible to delete its client links but a check must first be carried out to ensure that the trail is not supporting lower-rate trails. For example a VC4 trail cannot be deleted if it is carrying a VC12 trail; the VC12 trail would need to be deleted first. Thus, the delete Y-ripple mechanism checks to see whether a trail to be deleted is carrying any lower-rate trail and, if not, deletes the trail and the client links which were created by the add Y-ripple mechanism when the trail was created.

Conflicting Trails

From the point of view of the trail provider, a trail comprises two (or more) termination points joined by a series of connections (subnetwork connections) within NEs and link connections between NEs, themselves supported by links between NEs. (A connection within an NE allows traffic to flow across the NE between two or more points, each of which may be a trail termination point or a connection termination point, where a connection termination point terminates a link connection).

Conflicts between trails arise when two trails seek to occupy the same link connection (channel) in the same link. The trail provider needs to operate a mechanism to prevent such conflict between trails which it provisions or sets up (whether server or client trails). This problem is addressed in a further aspect of the present invention, a preferred embodiment of which is described below (headed V-Ripple Mechanism 1).

Another source of conflicting trails arises from the provisioning of trails by two or more different trail managers or trail management entities on a network when those trail managers have, even temporarily, different views of the network. Only one "supervisory" trail manager, for example of a type capable of implementing aspects of the present invention, is likely to be present on a network but other trail management entities having trail management functions, such as different connection trail management systems performing connection management, are likely to exist on a network. Conflicting trails may arise if such trail managers are decoupled, for example with inadequate transaction control or security control between them to prevent them provisioning conflicting trails.

If one user has set up a server trail via a first trail manager and then a second user sets up a second server trail via a second trail manager or management entity and in one or more links the trails claim the same link connection, or if two trails have the same termination point, then the trails will conflict. Two trails conflicting is not possible in the real network because as data is sent from both sources (one source on each trail) simultaneously, the data needs to be carried by the same link connection, which cannot happen. How the network itself handles this problem if it occurs is beyond the scope of this document but from the point of view of the trail managers the position is as follows.

A "supervisory" trail manager regularly interrogates each NE to obtain a report of the status of the network. (Alternatively, a system may use a notification mechanism whereby NEs inform the trail manager of connection changes). If the trail manager learns that a trail has been provisioned on the network by another trail management entity, then the trail manager is said to have learnt the new trail from the network. If the network-learnt trail conflicts in any link with a trail set up by the trail manager, then the trail manager must seek a decision from its user as to how to resolve the conflict, for example by deleting and re-provisioning its own trail (i.e. by trail manager action) or by requesting negotiation with the user who provisioned the network-learnt trail (i.e. by negotiation and then trail manager action).

The problem of identifying conflicts of this type is addressed in another aspect of the invention, a preferred embodiment of which is described below (headed V-Ripple Mechanism 2).

The invention in this aspect thus aims to provide an operator with sufficient information to allow identification and coordinated resolution of conflicts between his requirements for network connections and resource availability.

V-Ripple Mechanism 1—Add

When a new client trail is to be set up within a server trail, it will require a new channel on each link of the trail in order to accommodate its bandwidth. It is necessary to add the new channel without disrupting or conflicting with existing client trails. A first embodiment of the invention provides a "V-ripple mechanism" for achieving this.

Figure 5:
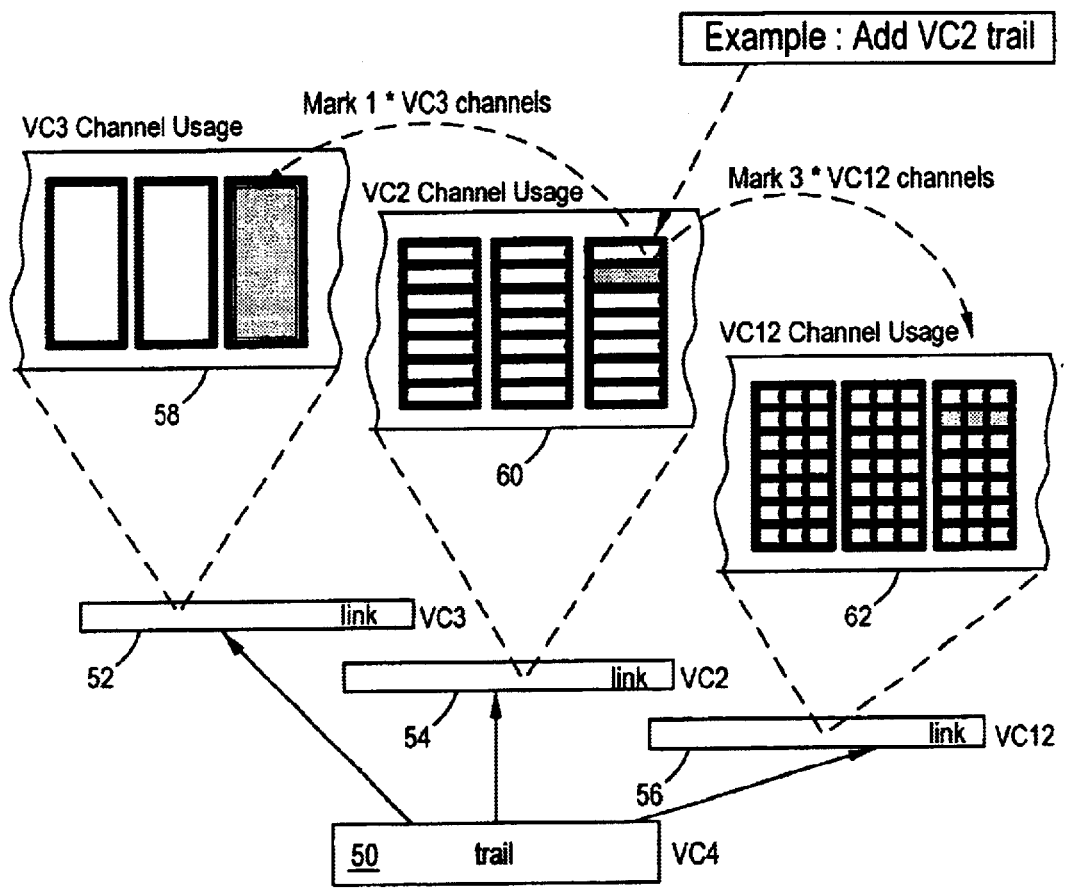
FIG. 5 illustrates the addition of a VC2 client trail within a VC4 server trail according to a first embodiment of the invention.

The embodiment will now be described taking as an example a VC2 client link of a VC4 server trail in which a new VC2 link connection is to be added to accommodate a request for a VC2 client trail carried by the VC4 trail. This is illustrated in FIG. 5. The VC4 trail 50 can be decomposed via client links into VC3, VC2 and VC12 peer links 52, 54, 56 (assuming that the trail termination points both have the requisite adaptation capabilities). FIG. 5 shows the corresponding channel usage maps 58, 60, 62 for each of these peer links. In this case there are no channels in use before the new VC2 channel is requested. The new channel is first marked as, for example, VC2 channel (3,2) in the VC2 channel usage map. The ripple mechanism then marks the equivalent channels in the corresponding channel usage maps for the VC2 link's peer links, i.e. the VC3 and VC12 usage maps 58, 62. Thus VC3 channel (3) and VC12 channels (3,2,1), (3,2,2) and (3,2,3) are marked.

The same procedure is carried out in each link of the requested client trail.

In more general terms, to create a trail this ripple mechanism involves the following steps in each link:
a) mark the channel selected for the new trail on the same-rate link; and
b) mark as used in all peer links any higher-rate channel or lower-rate channels equivalent to the new trail channel marked in step (a).

V-Ripple Mechanism 1—Delete

When a trail is torn down or deleted, the bandwidth used in each link can be freed for use by other trails, but it is necessary to ensure that the links (usage maps) are correctly updated. The problem is that if a lower-rate channel is freed, a corresponding higher-rate channel cannot simply be unmarked (or remarked as unused) because another lower-rate channel using some of the same bandwidth as that higher-rate channel may still be in use. Simply unmarking the higher-rate channel would then incorrectly indicate that the whole higher-rate channel were available for use.

Figure 6:
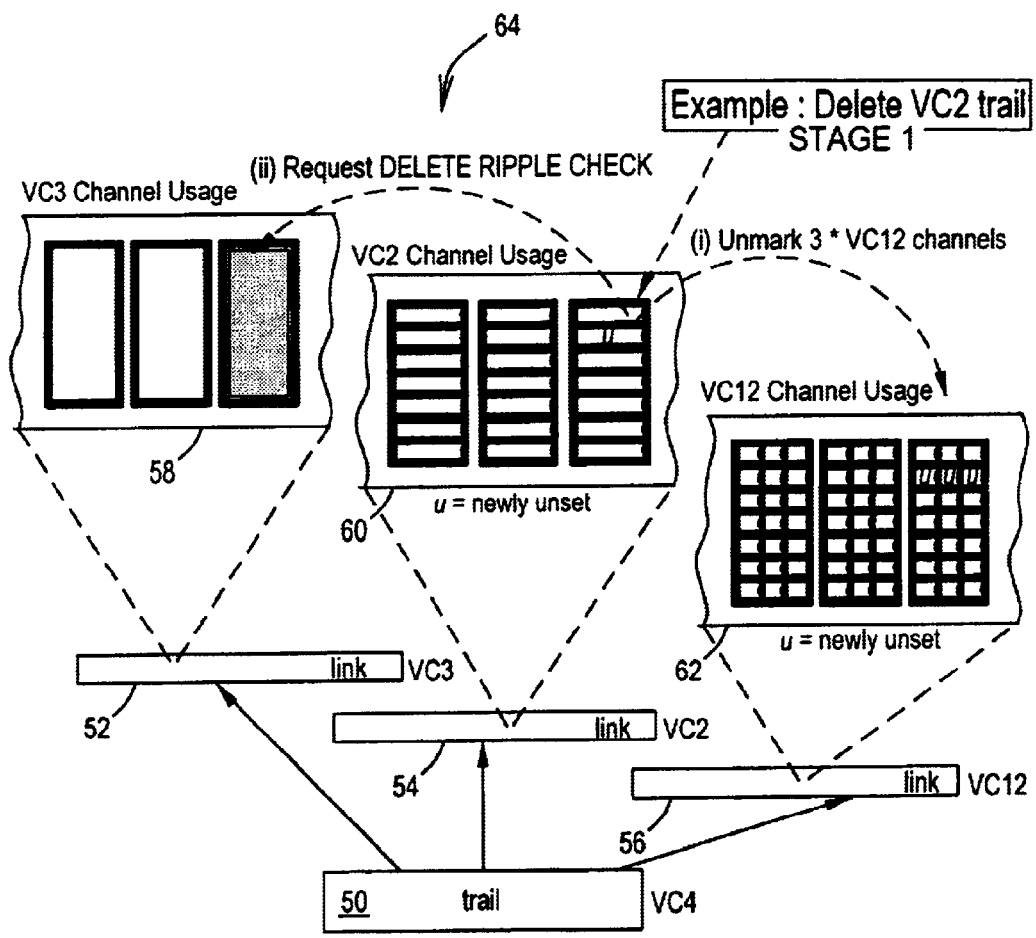
FIGS. 6 and 7 illustrate respectively first and second stages in the process of deleting a VC2 client trail within a VC4 server trail according to a further aspect of the first embodiment of the invention.
Figure 7:
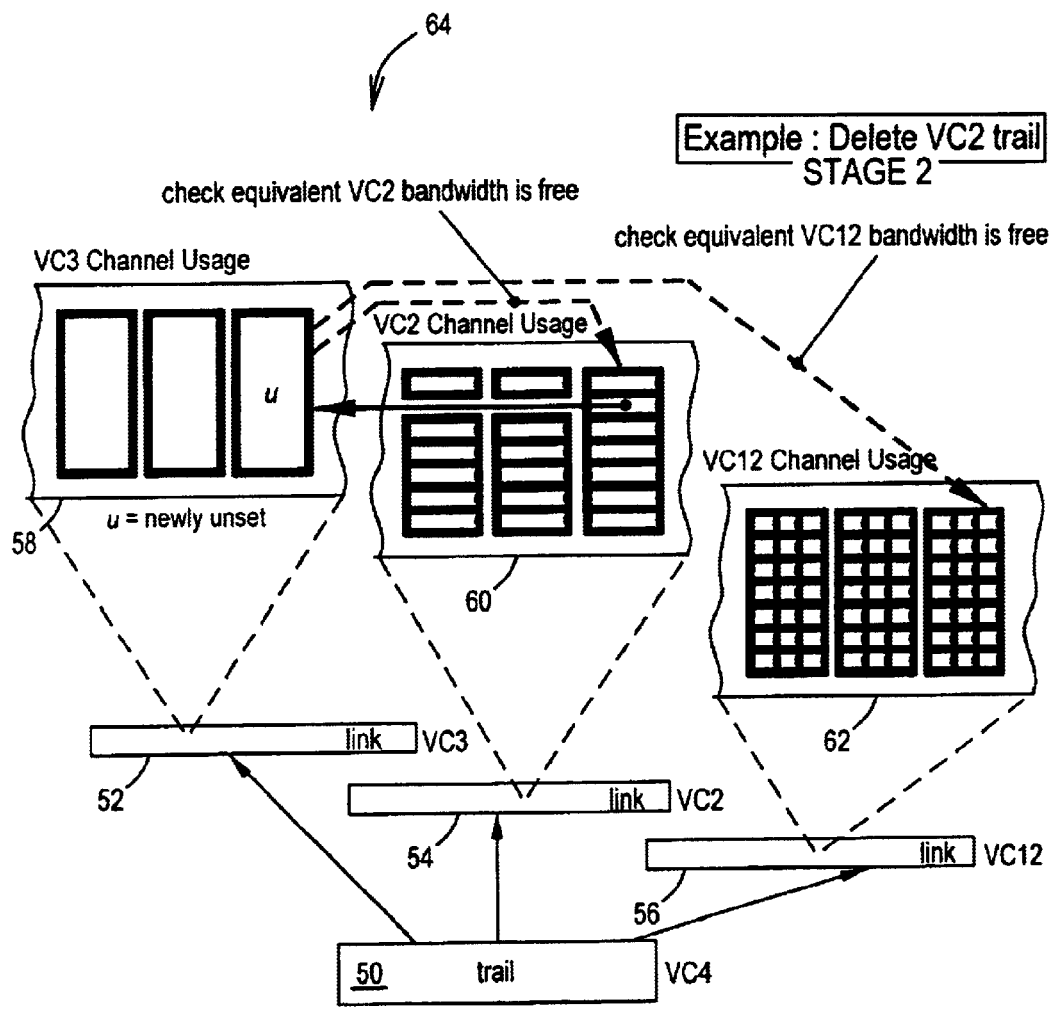

This delete ripple mechanism avoids this problem as illustrated in FIGS. 6 and 7, which show the deletion of the VC2 channel (3,2) added in FIG. 5.

In stage one of the ripple mechanism, as shown in FIG. 6, the VC2 channel (3,2) is unmarked in the VC2 link 60 and all equivalent lower-rate channels are unmarked in their respective links. In this case VC12 channels (3,2,1), (3,2,2) and (3,2,3) are automatically unmarked in the VC12 link 62. However, before corresponding higher-rate peer channels can be unmarked, a delete ripple check 64 is requested. This is carried out in stage 2 of the ripple mechanism as shown in FIG. 7.

The delete ripple check checks whether it is safe to unmark the channel which is marked in the higher-rate (VC3) link 58 and which is equivalent to the deleted trail (VC2 channel (3,2) in this case). To do this, it checks whether all of the lower-rate channels in all peer links equivalent to the higher-rate channel to be unmarked are free. If this is so, the higher-rate channel (VC3 channel (3) in FIG. 7) is unmarked. It should be noted that the lower-rate channels of the deleted trail have already been unmarked, so the delete ripple check is a check for channels in other trails.

Put in more general terms, this delete ripple mechanism 1 involves the following actions:
(a): unmark the channel in the link of the same data rate as the deleted trail (VC2 channel (3,2) in the VC2 link in FIG. 6);
(b): for links of lower rate than the deleted trail, translate the channel usage into the equivalent channels of the lower-rate link (translate VC2 channel (3,2) into corresponding VC12 channels (3,2,1), (3,2,2) and (3,2,3)) and unmark those lower-rate channels in the lower-rate link;
(c): request a delete ripple check as set out in steps (d) to (g) to update higher-rate links;
(d): for each link of higher rate than the deleted trail, in order from lowest rate to highest rate, carry out steps (e) to (g);
(e): translate the deleted channel (VC2 channel (3,2)) to the equivalent channel in the higher-rate link for checking (VC3 channel (3));
(f): for each link of lower rate (VC2, VC12) than the link being checked (VC3), check to see whether all equivalent bandwidth in the lower-rate link is free (unmarked); and
(g): if all the equivalent bandwidth in lower-rate links is free, unmark the channel being checked in the higher-rate link (VC3 channel (3)).

V-Ripple Mechanism 2

Ripple Mechanism 1 described above allows a trail manager to avoid conflicts between trails which it sets up itself but does not consider the issue of network-learnt trails, which may also lead to two or more trails claiming the same piece of bandwidth within a link (e.g. two VC12 trails claiming the same channel) or between peer links (e.g. VC3 and VC12 trails claiming overlapping bandwidth). V-Ripple mechanism 2 is a preferred embodiment of the invention addressing this latter problem.

Figure 8:
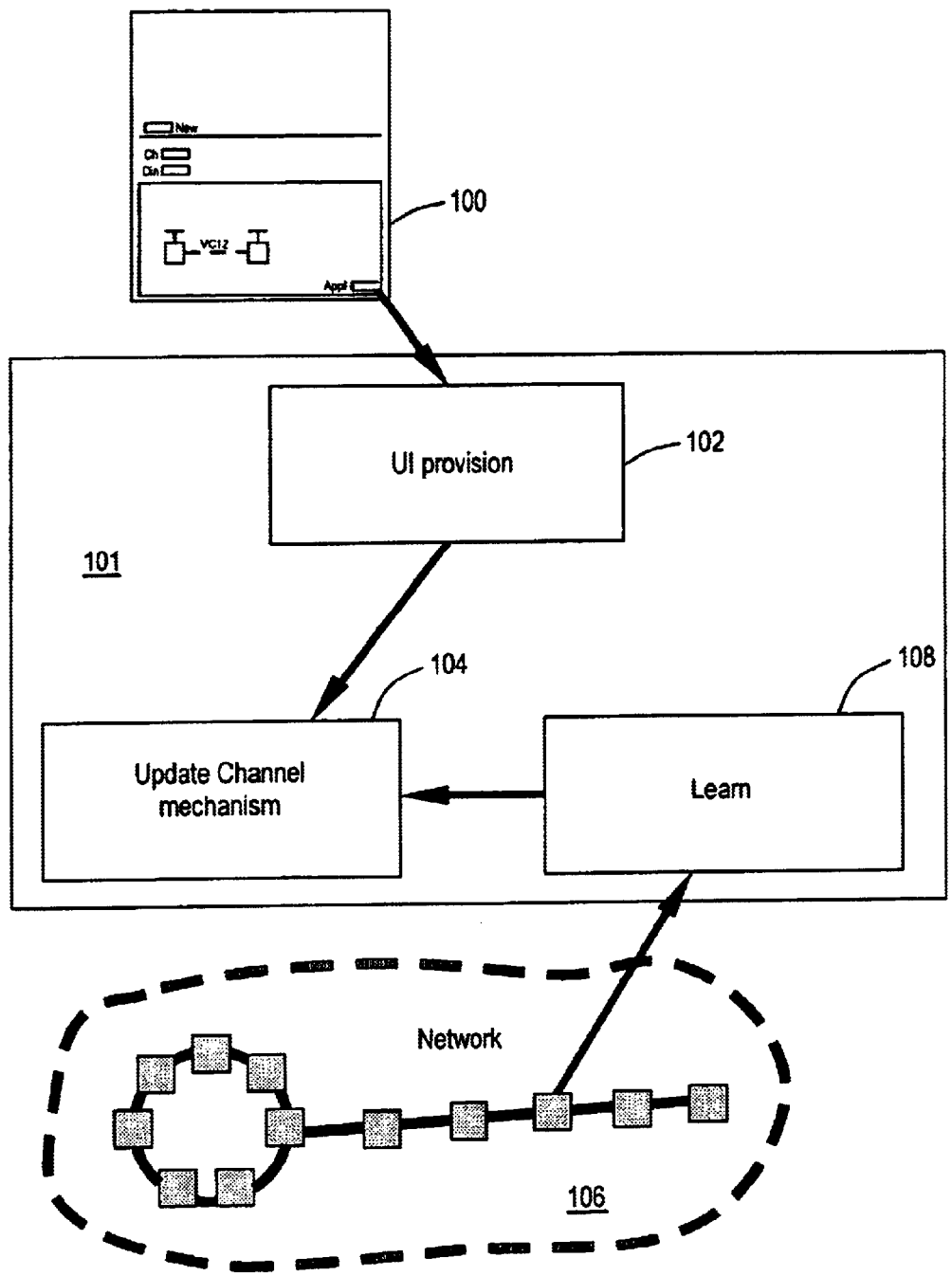
FIG. 8 is a block diagram of a trail manager illustrating network-learning of trails.

FIG. 8 illustrates the problem, in which a user instructs a trail manager 101 via a user interface (UI) 100 to provision a trail using a UI provision means 102. The trail manager then uses an update-channel mechanism 104 to try to set up the trail. A second trail has been set up on the network 106 by another trail manager or other connection provisioning entity, and the trail manager 101 learns this second trail from the network by interrogating the network elements using a trail learn means 108. The learnt trail is notified to the update-channel mechanism of the trail manager which implements the ripple mechanism of the embodiment to assess conflict between the trails.

When the trail manager adds or learns a new trail, it needs to check for newly-created conflicts and to mark trails "in conflict" as appropriate for further action (usually involving alerting a user or operator to the problem for a decision to be made as to how to resolve the conflict). When it deletes a trail, it needs to check to see which previously conflicting trails are no longer in conflict.

V-Ripple Mechanism 2—Add

Figure 9:
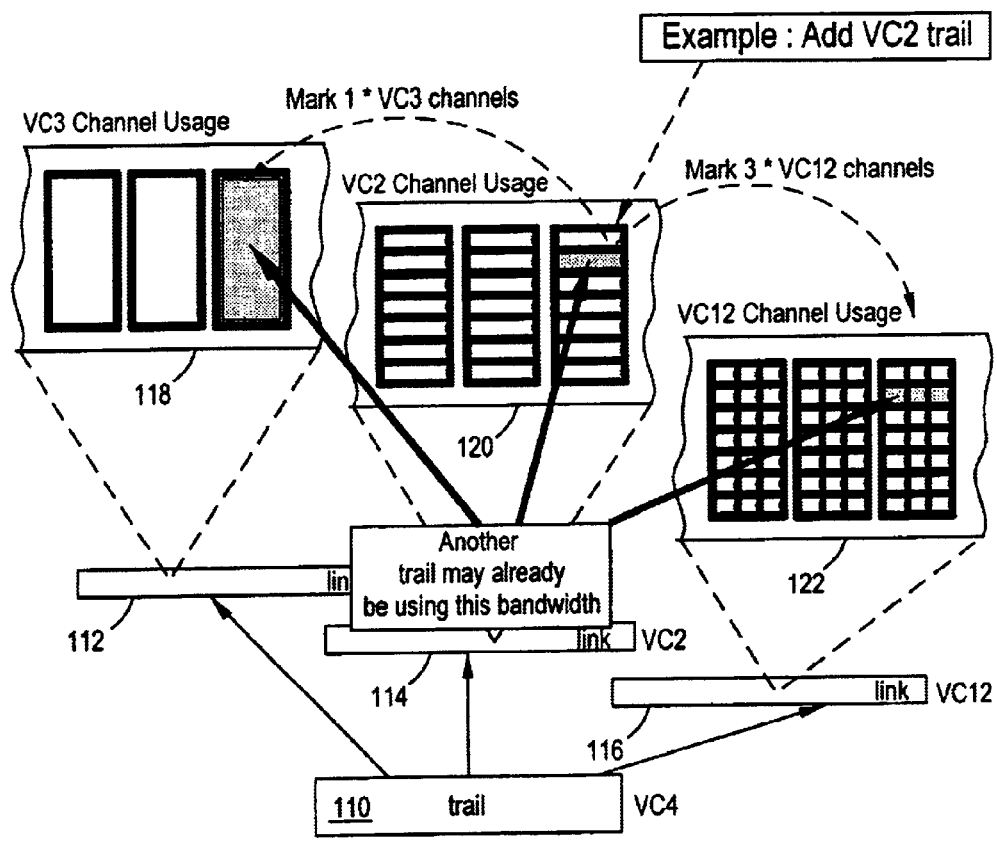
FIG. 9 illustrates the addition of a VC2 client trail within a VC4 server trail according to a second embodiment of the invention.

FIG. 9 illustrates this mechanism for adding a trail with reference to the example of adding a VC2 client trail within a VC4 server trail.

FIG. 9 shows the VC4 server trail 110 and the respective client links to the corresponding VC3, VC2 and VC12 links 112, 114, 116 as well as usage map representations 118, 120, 122 of the information stored in those links.

To add the new VC2 client trail a VC2 channel (channel (3,2)) is marked in the VC2 link. This channel usage is then translated into the equivalent form for each higher and lower rate link and the corresponding higher-rate channel (VC3 channel (3)) and lower-rate channels (VC12 channels (3,2,1), (3,2,2) and (3,2,3)) are marked as used. In each link (VC3, VC2 and VC12), if one or more other trails claim any of the same channels, then the new VC2 trail and the one or more other trails are added to a list of conflicting trails and marked as "in conflict".

This specific example may be summarised as follows:

To add a VC2 link connection in a VC12, VC2, VC3 client link environment:
(i) Consider VC12 channels equivalent to a VC2 channel selected for the link connection. Set each VC12 channel. Add to a list any VC12 trails conflicting with each VC12 channel.
(ii) Consider the selected VC2 channel. Set the selected VC2 channel and add to the list any VC2 trails conflicting with it.
(iii) Consider the VC3 channel equivalent to the selected VC2 channel. Set the VC3 channel and add to the list any VC3 trails conflicting with it.
(iv) Set any trails on the "conflicting trail" list to "in conflict".

In more general terms, this add ripple mechanism involves the following steps:
(a): Mark the channel selected for the new trail on the same-rate link, and note any conflicting trails at this rate;
(b): translate the selected channel to equivalent higher and lower rate channels, mark the equivalent channels on the corresponding links and at each higher and lower rate note any conflicting trails at that rate; and (c): mark as "in conflict" all trails noted as in conflict in the preceding steps and the new trail if any conflicts have been noted.

It should be noted that trails may conflict if there is a conflict in any link which they have in common.

V-Ripple Mechanism 2—Delete

Deleting a trail may result in the removal of conflict from trails and so the delete mechanism needs to account for any required change to the "in conflict" status of trails and also should not free a channel apparently freed by deleting a trail if another trail or trails claims the same bandwidth.

Figure 10:
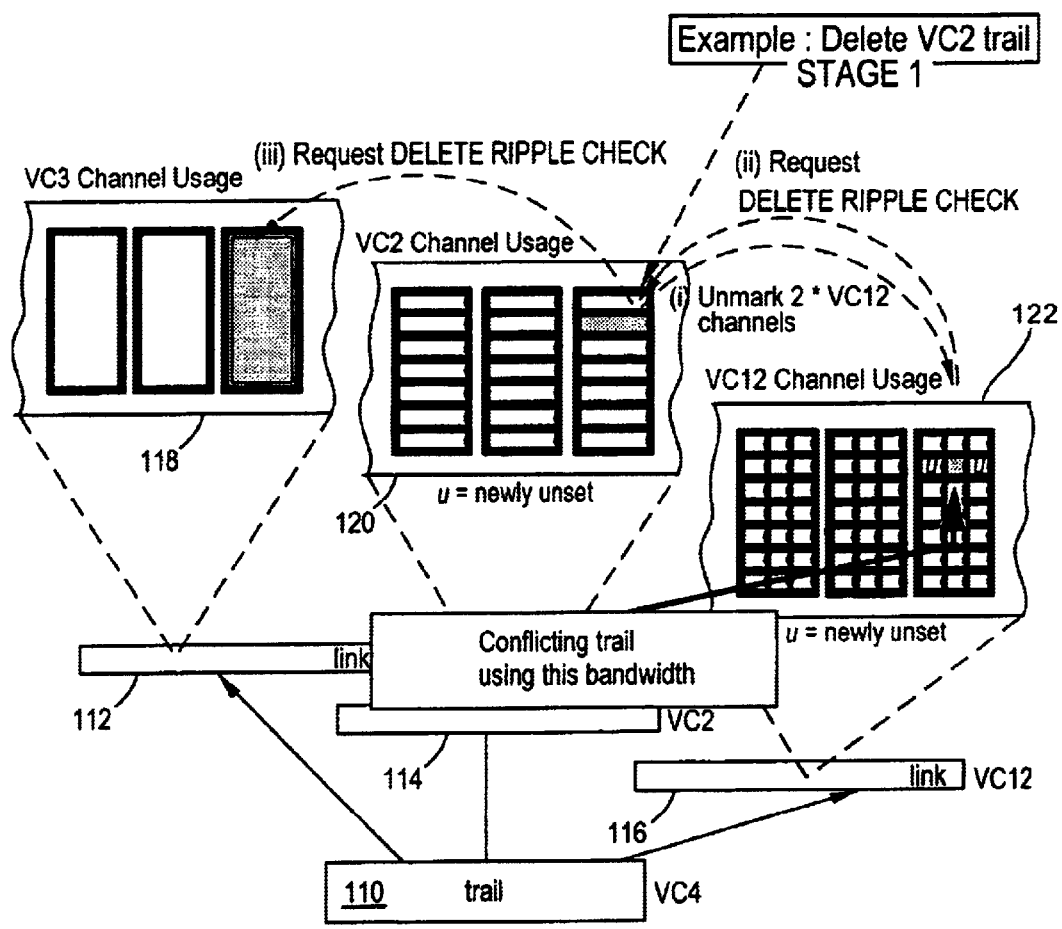
FIGS. 10 and 11 illustrate respectively first and second stages in the process of deleting a VC2 client trail within a VC4 server trail according to a further aspect of the second embodiment of the invention.
Figure 11:
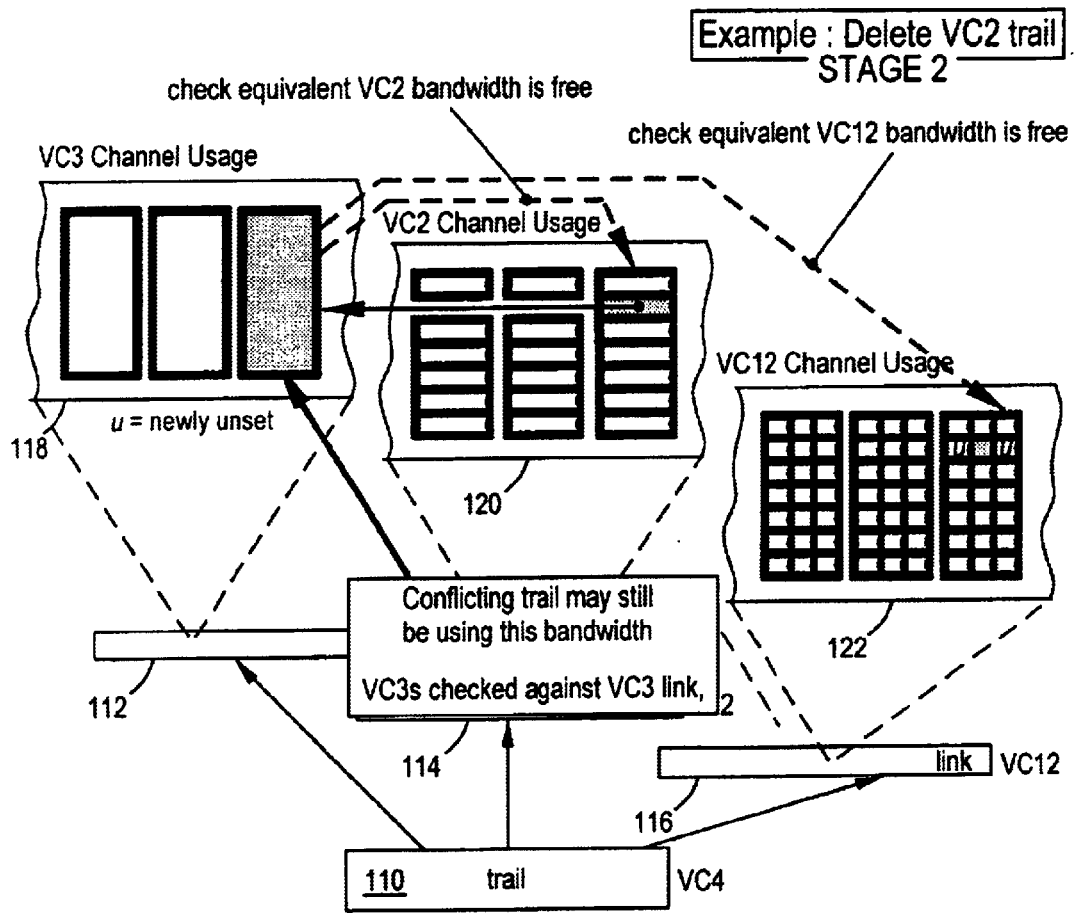

FIGS. 10 and 11 illustrate stages 1 and 2 of this delete ripple mechanism, taking as an example the deletion of the VC2 client trail added as described above with reference to FIG. 9. Corresponding reference numerals are used in FIGS. 9, 10 and 11.

First, VC2 channel (3,2) corresponding to the deleted VC2 trail is translated into equivalent channels in the lowest-rate peer link, which is the VC12 link, i.e. into channels (3,2,1), (3,2,2) and (3,2,3). A VC12 to VC12 "ripple check" is then carried out, in which for each VC12 channel the delete mechanism checks whether a conflicting VC12 trail claims that bandwidth (the delete ripple checks in this mechanism are similar but not identical to that in Ripple Mechanism 1, as they involve conflict checks). If not, then the mechanism checks for each VC12 channel whether a trail other than the deleted VC2 trail in any higher-rate peer link claims overlapping bandwidth. Thus, it performs a VC2 to VC2 ripple check to check whether a VC2 trail (other than the deleted trail) claims VC2 channel (3,2) and a VC3 to VC3 ripple check to check whether a VC3 trail claims VC3 channel (3). For each VC12 channel, if all of these checks show no trails claiming the same or overlapping bandwidth, then that VC12 channel is unmarked (or unset). In FIG. 10, VC12 channels (3,2,1) and (3,2,3) have been unmarked but VC12 channel (3,2,2) has not been unmarked because a conflicting VC12 trail claims this channel. A note of the conflicting trail is made on a list of conflicting trails generated during this delete procedure.

Then, each link at a higher rate than VC12 is considered in turn, in order from the lowest rate to the highest. The VC2 link is therefore considered next, in which VC2 channel (3,2) is marked. Before this channel can be unmarked, it is necessary to ensure that no conflicting VC2 trails (other than the deleted trail) claim VC2 channel (3,2) itself, that no corresponding channels at lower rates (VC12) are marked as used, and that no trails at higher rates (VC3) claim overlapping bandwidth. Some of these checks have effectively been performed by the VC12 checks already carried out as described above. Because VC2 channel (3,2) was carrying the deleted trail, both it and all equivalent higher and lower rate channels must have been marked as used before the delete mechanism was implemented. The delete mechanism has already considered whether any of the VC12 channels could be unmarked, and can only have unmarked any one or more of them if no conflicting trails claim the or each unmarked VC12 channel and no conflicting trails claim the equivalent VC2 channel and no conflicting trails claim the equivalent VC3 channel. Therefore, when the delete mechanism checks whether the VC2 channel can be unmarked, it only needs to perform a VC2 to VC12 ripple check to check whether the equivalent lower-rate VC12 channels are marked or unmarked. If they are all unmarked, the VC2 channel can be unmarked because it is then known that there are no conflicting VC12, VC2 or VC3 trails. If any one or more of the equivalent VC12 channels is marked, then the VC2 channel cannot be unmarked because if one or two VC12 channels are marked, at least one or two conflicting VC12 trails must exist, and if all three VC12 channels are marked, then either three (or more) conflicting VC12 trails, or at least one conflicting VC2 or VC3 trail, or some combination of these, must exist.

In the example described above, VC12 channel (3,2,2) is marked and so VC2 channel (3,2) cannot be unmarked.

A check must also be made to identify any conflicting trails claiming VC2 channel (3,2) itself, so that they can be added to the list of conflicting trails. Other trails claiming other VC2 channels would not lead to conflicts.

Next, the VC3 link must be checked. This is illustrated in FIG. 11. Before the VC3 channel can be unmarked it is necessary to ensure that no channels equivalent to VC3 channel (3) are marked in the lower-rate VC2 and VC12 links and that no conflicting VC3 trails claim VC3 channel (3) itself. In the case of VC3, there are no higher-rate peer links in which trails may claim overlapping bandwidth, and so no higher-rate check is needed.

Although it is necessary to ensure that all of these requirements are met before the VC3 channel can be unmarked, it is not necessary to check all of the requirements because some have already been checked. In particular, it should be unnecesary to check the marking of any of the VC12 channels because the marking of all VC2 channels in the VC2 link should be correct and should accurately reflect the marking of all VC12 channels in the VC12 link. Although the VC3 channel overlaps other VC2 channels in addition to the VC2 channel carrying the deleted trail (which is the subject of the current delete mechanism), the marking of all VC2 (and all other) channels is continuously kept up to date by the appropriate add and delete mechanisms described herein being carried out each time a trail is provisioned or deleted. In relation to the deleted VC2 trail itself, a VC2 to VC12 ripple check, a VC2 to VC2 ripple check and a VC3 to VC3 ripple check have already been carried out and so the VC2 channel carrying the deleted trail has already been updated (i.e. unmarked as appropriate) as part of the current delete mechanism. Therefore, to assess whether the VC3 channel may be unmarked only a VC3 to VC2 ripple check need be carried out to determine whether any of the VC2 channels equivalent to the VC3 channel are marked. If none are marked, the VC3 channel can be unmarked. If any equivalent VC2 channels are marked, the VC3 channel cannot be unmarked.

In the example it is found that VC2 channel (3,2) is marked, so VC3 channel (3) cannot be unmarked. A check is then performed to identify any VC3 trails conflicting with VC3 channel (3), in order to note any conflicting VC3 trail or trails on the list.

It should be noted that no VC2 to VC2 ripple check and no VC3 to VC3 ripple check are performed while assessing whether the VC2 or VC3 channels may be unmarked because these checks had already been carried out when assessing whether the VC12 channels equivalent to the deleted trail could be unmarked. Nevertheless, any conflicting VC2 and VC3 trails were added to the list of conflicting trails only after assessing whether the VC2 and VC3 channels could be unmarked. This effectively duplicates the VC2 to VC2 and VC3 to VC3 ripple checks. In an alternative embodiment, the entire list of conflicting trails could be compiled as a result of the VC12 to VC12, VC2 to VC2 and VC3 to VC3 ripple checks carried out to assess whether the VC12 channels could be unmarked. This would advantageously eliminate a small amount of redundancy from the delete mechanism.

As a final stage of the ripple mechanism deletion of the VC2 trail, a conflict-release operation is performed to change the state of any appropriate trails from "in conflict" to not in conflict. This is performed as follows.

The delete mechanism described above has generated a list of conflicting trails which, in the example, contains only a note of the conflicting trail claiming VC12 channel (3,2,2). The first step in the conflict-release mechanism is to assess whether this trail on the list is still in conflict with any other trails (at any data rate) in the link under consideration. If it is, then it must be removed from the list. In the example, since deletion of the VC2 trail there is no longer a conflict in the considered link and so the VC12 trail noted on the list remains on the list.

A similar check must then be carried out for all links of each trail on the list. Any trail for which any such conflict remains in any link of the trail is removed from the list. In the example, if we assume no conflict between the listed VC12 trail and any other trail exists in any common link, the VC12 trail remains on the list.

A check is then made for any trails remaining on the list which have termination point conflicts with any other trail. If any trails on the list have termination point conflicts they are removed from the list. In the example if we assume no termination point conflicts for the one listed trail, the trail remains on the list.

Finally, any trails which remain on the list have their "in conflict" state changed. In the example, deletion of the VC2 trail has removed the only conflict with the VC12 trail, which can therefore have its "in conflict" marking removed.

It should be noted that the add and delete update-channel operations described above focus on individual links of a trail, but that it is necessary to look across all the links of a trail and its termination points to determine whether or not it is free of conflict.

This specific example may be summarised as follows:

To delete a VC2 link connection in a VC12, VC2, VC3 client link environment:

(i) Ripple check VC12 to VC12; i.e. convert VC2 channel to equivalent VC12 channels and for each VC12 channel, check for conflicting VC12 trails; ripple check VC2 to VC2 and VC3 to VC3; i.e. check for VC2 trails (other than the deleted trail) and/or VC3 trails claiming overlapping bandwidth in VC2 or VC3 client links respectively.

Clear VC12 channel if checks find no conflicting VC12 trails or overlapping higher-rate trails, otherwise leave VC12 channel set and add any conflicting VC12 trail(s) to list (to gather VC12 conflicting trails).

(ii) Ripple check VC2 to VC12; i.e. convert VC2 channel to equivalent VC12 channels and check to see if all equivalent VC12 channels in VC12 layer are clear, otherwise VC2 cannot be cleared. If all equivalent VC12 space is free, then VC2 channel can be freed. Identify and add to list any conflicting VC2 trails in VC2 layer (to gather VC2 conflicting trails on list).

(iii) Ripple check VC3 to VC2 ; i.e. convert VC2 channel to equivalent VC3 channel. Convert VC3 channel to equivalent VC2 channels. Check to see if all equivalent VC2 channels in VC2 layer are clear, otherwise VC3 cannot be cleared. If all equivalent VC2 space is free, then VC3 channel can be freed. Identify and add to list any conflicting VC3 trails in VC3 layer (to gather VC3 conflicting trails on list).

(iv) For each trail in list of conflicting trails, determine whether removal of deleted trail has removed conflict from the listed trail:

(a) Check to see if listed trail still has conflict within THIS LINK.

(b) If not, check to see if trail has conflict IN ANY OF ITS LINKS (i.e., any bandwidth conflict for the trail).
(c) If not, check to see if trail has termination point conflicts. p1 (d) If not, the removal of the deleted trail has removed the conflict from the considered listed trail, so it can have its "in conflict" status removed.

In general terms, in this embodiment at each layer (data rate) above the lowest it is therefore only necessary to check the or each relevant channel in each layer against the equivalent channels in the next lower level (next lower rate) to provide an accurate indication of whether the equivalent channels in all lower levels are free (unmarked).

Also, certain checks required to determine whether a channel may be unset may be carried out as a sequence of checks, each being performed only if the previous check in the sequence is clear. For example, in step (i) set out above, for each VC12 channel equivalent to the deleted VC2 trail, three checks are performed (Is there a conflicting VC12 trail? Is there an overlapping VC2 trail? Is there an overlapping VC3 trail?) and failure at any of these checks prevents the VC12 channel being cleared. Therefore if a check is made first for a conflicting VC12 trail and a conflicting VC12 trail is found, there may be no need to check for overlapping VC2 or VC3 trails. There may even be no need to look for any further conflicting VC12 trails except for the purpose of completing the conflicting trails list. Stopping the series of checks in this way as soon as a result is found which prevents a channel being unmarked would reduce the processing required to perform the checks and increase the speed of the checking procedure.

The checking procedure may also advantageously be made more efficient by removing redundant, or repeated, checks. For example, if in step (i) the checks of higher-rate peer links are made without consideration of redundancy, the following checks are made:

VC12 (3,2,1) requires check of VC2 (3,2) and VC3 (3)
VC12 (3,2,2) requires check of VC2 (3,2) and VC3 (3)
VC12 (3,3,3) requires check of VC2 (3,2) and VC3 (3)

Because each VC12 channel overlaps with (is in the shadow of) the same VC2 channel and the same VC3 channel, for each VC12 channel the same VC2 and VC3 channels must be checked. Redundancy may therefore be advantageously reduced by checking the relevant VC2 and/or VC3 channels only once for all three VC12 channels in the example.

As a further example, consider the deletion of a VC3 trail in VC3 channel (1) in a VC3, VC2, VC12 peer link environment. This requires the 21 VC12 channels equivalent to VC3 channel (1) to be checked to assess whether any of them can be unmarked. Each such check of a VC12 channel entails checking for higher-rate trails (VC2 or VC3) claiming overlapping bandwidth, but without considering redundancy, many of these checks of higher-rate trails would check the same higher-rate channels. Thus, VC12 channels (1,1,1) to (1,7,3) would need to be checked as follows (in addition to the checks for same-rate VC12 to VC12 conflicts):

VC12 (1,1,1) requires check of VC2 (1,1) and VC3 (1)
VC12 (1,1,2) requires check of VC2 (1,1) and VC3 (1)
VC12 (1,1,3) requires check of VC2 (1,1) and VC3 (1)
VC12 (1,2,1) requires check of VC2 (1,2) and VC3 (1)
VC12 (1,2,2) requires check of VC2 (1,2) and VC3 (1)
VC12 (1,2,3) requires check of VC2 (1,2) and VC3 (1)
VC12 (1,3,1) requires check of VC2 (1,3) and VC3 (1)
VC12 (1,3,2) requires check of VC2 (1,3) and VC3 (1)
VC12 (1,3,3) requires check of VC2 (1,3) and VC3 (1)
VC12 (1,4,1) requires check of VC2 (1,4) and VC3 (1)
VC12 (1,4,2) requires check of VC2 (1,4) and VC3 (1)
VC12 (1,4,3) requires check of VC2 (1,4) and VC3 (1)
VC12 (1,5,1) requires check of VC2 (1,5) and VC3 (1)
VC12 (1,5,2) requires check of VC2 (1,5) and VC3 (1)
VC12 (1,5,3) requires check of VC2 (1,5) and VC3 (1)
VC12 (1,6,1) requires check of VC2 (1,6) and VC3 (1)
VC12 (1,6,2) requires check of VC2 (1,6) and VC3 (1)
VC12 (1,6,3) requires check of VC2 (1,6) and VC3 (1)
VC12 (1,7,1) requires check of VC2 (1,7) and VC3 (1)
VC12 (1,7,2) requires check of VC2 (1,7) and VC3 (1)
VC12 (1,7,3) requires check of VC2 (1,7) and VC3 (1)

Therefore to do this series of checks requires for each VC12 channel the same look-up call of VC3 (1) and for each group of three VC12 channels the same look-up call of the VC2 channel corresponding to the first two numbers in the VC12 decomposition form (coordinate), 3x7x3. Efficiency can be advantageously improved by recognising this pattern and only checking each VC2 channel once for each group of three equivalent VC12 channels and/or checking each VC3 channel once for each group of 21 equivalent VC12 channels, rather than doing so repeatedly for each VC12 channel.

In more general terms, when a channel of a given rate is deleted, a check for conflicting channels at that rate need only be performed once in order to determine whether all equivalent lower-rate channels may be unmarked. Repeated checking to assess whether each lower-rate channel may be unmarked is unnecessary. Similarly, where any group of lower-rate channels corresponds to the bandwidth of a single higher-rate channel, a check for higher-rate trails claiming that higher-rate channel need only be carried out once while checking whether each of the group of lower-rate channels may be unmarked.

V-Ripple Mechanism 2—Delete; General Description

In more general terms the delete trail operation of the V-Ripple Mechanism 2 embodiment involves the following steps:

(a): translate the channel carrying the deleted trail into equivalent channels at the lowest peer-link rate (if the channel is not in the lowest peer-link rate);
(b): unmark each equivalent lowest-rate channel if no conflicting same-rate trail claims the same channel and no higher-rate trail claims overlapping bandwidth;
(c): note any conflicting trail(s) found in step (b) on a list of conflicting trails;
(d): in each successively-higher-rate peer link, from the second-lowest-rate link to the highest-rate link, unmark each channel equivalent to the channel carrying the deleted trail if no conflicting same-rate trail claims the channel, no higher-rate trail claims overlapping bandwidth and no lower-rate equivalent channel is marked as used;
(e): note any conflicting trail(s) found in step (d) on the list of conflicting trails;
(f): repeat steps (a) to (e) for each link of the deleted trail;
(g): carry out the series of tests in steps (h) to (j) to evaluate whether each of the trails on the conflicting-trails list can have their "in conflict" status removed;
(h): determine for each listed trail whether it is in conflict with another trail or trails (at any rate) in any of its links and, if so, remove it from the list;
(i): determine for each listed trail whether it has termination point conflicts with another trail or trails (at any rate) and, if so, remove it from the list; and
(j) remove the "in conflict" status of each trail remaining on the list.

The skilled person will readily appreciate that the order and specification of certain of the steps listed above may be changed in different embodiments without affecting the implementation of the invention. For example steps (h) and (i) may be reversed and steps (c) and (e) may be amalgamated so that all conflicting trails at any rate are added to the list immediately after the delete ripple checks relating to the lowest-rate channels. Other such changes (such as those described above with reference to the specific embodiments) may similarly be implemented while remaining within the teaching and scope of the invention.

The description of the V-Ripple Mechanism 2 in general terms set out above provides the criteria which must be met in order to assess whether channels may be unmarked but, as described above in relation to the example of VC3, VC2 and VC12 client links, in preferred embodiments of the invention a certain amount of redundancy may be avoided in checking whether each channel may be unmarked. According to such a preferred embodiment, these checks may be performed in the following general terms.

(a) if the channel carrying the deleted trail is not in the lowest-rate peer link, translate it into equivalent channels at the lowest peer-link rate;

(b) for each equivalent lowest-rate channel (or for the channel carrying the deleted trail, if it is in the lowest-rate peer link) check for conflicting same-rate trails claiming the same channel and check for higher-rate trails claiming overlapping bandwidth (preferably avoiding redundancy by not repeatedly checking each overlapping higher-rate channel) and, if none are found, unmark that lowest-rate channel in the lowest-rate link;

(c) note any conflicting lowest-rate trail(s) found in step (b) on a list of conflicting trails;

(d) in each successively-higher-rate peer link, from the second-lowest-rate link to the highest-rate link, consider each channel equivalent to or overlapping the channel carrying the deleted trail and unmark it if and only if all equivalent channels in the next-lower-rate link are unmarked;

(e) identify any same-rate trail(s) conflicting with any of the channels considered in step (d) and note it or them on the list of conflicting trails;

(f) repeat steps (a) to (e) for each link of the deleted trail;

(g) carry out the series of tests in steps (h) to (j) to evaluate whether each trail on the conflicting-trails list can have its "in conflict" status removed;

(h): determine for each listed trail whether it is in conflict with another trail or trails (at any rate) in any of its links and, if so, remove it from the list;

(i) determine for each listed trail whether it has termination point conflicts with another trail or trails (at any rate) and, if so, remove it from the list; and (j) remove the "in conflict" status of each trail remaining on the list.

These ripple mechanisms according to various aspects of the invention thus advantageously aim to keep an accurate view of which channels are really free in each link and to keep track of conflicts between trails as add and delete operations are performed. This enables a user to be kept accurately informed of conflicts arising as he creates trails and the effects of deleting trails in terms of removing these conflicts.

In summary, V-ripple mechanism 1 maintains an accurate view of bandwidth resource availability for UI provisioning only, while V-ripple mechanism 2 allows multiple trails to claim the same bandwidth (within a link at one data rate and between peer links at different rates), and thus can cope with conflicts caused by, for example, interactions of UI provisioning and the learn mechanism. V-Ripple mechanism 2 marks and removes conflicts from trails where appropriate as part of this functionality.

These mechanisms therefore combine advantageously with the Y-ripple mechanisms described herein which create client links for trails on the assumption that any conflicts can be dealt with as they arise. This produces a "soft" trail management system which reacts rapidly to requests for bandwidth and avoids the restrictive aspects of the alternative "hard" approach of using a controller with a complete overview of the network to allocate mutually-exclusive bandwidth to users so that it can be certain that no conflicts between users' trails will arise. This "hard" approach disadvantageously limits flexibility in that users cannot temporarily increase their bandwidth requirement without first seeking an increased bandwidth allocation from the controller.

The "soft" approach may advantageously be overlaid with a reservation scheme to yield any resource security management control that may be required in particular applications.

An enhancement of the invention according to a further aspect involves consideration of conflicts over time. In the model outlined so far, it is assumed that trails are created immediately and persist until they are manually deleted. An enhancement to the trail manager of the invention allows a user to schedule the activation and removal of trails on the network, for example requesting that a trail is activated at 8:00 pm this evening and removed at 10:00 pm.

In order to achieve this functionality, channels are still marked as being used all the time by a scheduled trail, but the conflict detection mechanism now has to consider whether trails are conflicting with each other over time as well as in bandwidth/termination resource. By marking a channel as being used all the time rather than just during the activation period of the trail, users can be prevented from placing a trail in resource that will subsequently, at a scheduled time, be claimed by a scheduled trail.

In a further embodiment, scheduled trails may share resource by using, for example, the same channels in a link at different times. If one scheduled trail is activated at, for example, 8:00 pm for two hours and a second scheduled trail is activated at 11:00 pm for one hour, the two scheduled trails may use the same or overlapping bandwidth and/or termination resource without conflict because they are not actively using the same resource at the same time. In this embodiment, therefore, when a scheduled trail is set up and conflict checks are performed, a conflict with another scheduled may only be noted if the two trails claim the same or overlapping resource and their scheduled activation times overlap.

What is claimed is:

1. A method for deleting trails on a network in a connection-management domain having peer links in which channels of different rates can be defined, in which, when a trail using a channel of a predetermined rate is deleted from a link, channel-usage information for that link and for all its peer links is updated, in which deleting a trail from a link comprises the following steps:

(a): unmark the channel in the link of the same data rate as the deleted trail;

(b): for each peer link of lower rate than the deleted trail (if any exist), translate the channel usage into the equivalent channels of the lower-rate link and unmark those lower-rate channels in the lower-rate link;

(c): request a delete ripple check as defined in steps (d) to (g) to update higher-rate peer links (if any exist);

(d): for each link of higher rate than the deleted trail, in order from lowest rate to highest rate, carry out steps (e) to (g);

(e): translate the deleted channel to the equivalent channel in the higher-rate link being checked;

(f): for each link of lower rate than the link being checked, check to see whether all equivalent bandwidth in the lower-rate link is free (unmarked); and (g): if all the equivalent bandwidth in the lower-rate links is free, unmark the channel in the higher-rate link being checked.

2. A method according to claim 1 in which, when a trail is deleted, if a trail marked "in conflict" is found to be no longer in conflict, the "in conflict" marking is removed.

3. A method according to claim 1 in which deleting a trail from a link comprises the steps of:

(a): translate the channel carrying the deleted trail into equivalent channels at the lowest peer-link rate;

(b): unmark each equivalent lowest-rate channel if no conflicting same-rate trail claims the same channel and no higher-rate trail claims overlapping bandwidth;

(c): note on a list of conflicting trails any conflicting trail(s) found in step (b);

(d): in each successively-higher-rate peer link, from the second-lowest-rate link to the highest-rate link, unmark each channel equivalent to the channel carrying the deleted trail if no conflicting trail claims the channel, no higher-rate trail claims overlapping bandwidth and no lower-rate equivalent channel is marked as used;

(e): note on the list of conflicting trails any conflicting trail(s) found in step (d);

(f): repeat steps (a) to (e) for each link of the deleted trail;

(g): carry out the series of tests in steps (h) to (j) to evaluate whether each trail on the conflicting-trails list can have its "in conflict" status removed;

(h): determine for each listed trail whether it is in conflict with another trail or trails in any of its links and, if so, remove it from the list;

(i): determine for each listed trail whether it has termination point conflicts with another trail or trails and, if so, remove it from the list; and (j) remove the "in conflict" status of each trail remaining on the list.

4. A method according to claim 1, in which deleting a trail from a link comprises the steps of;

(a) if the channel carrying the deleted trail is not in the lowest-rate peer link, translate it into equivalent channels at the lowest peer-link rate;

(b) for each equivalent lowest-rate channel (or for the channel carrying the deleted trail if it is a lowest-rate channel) check for any conflicting same-rate trail claiming the same channel and check for any higher-rate trail claiming overlapping bandwidth (preferably not repeatedly checking each overlapping higher-rate channel) and, if none are found, unmark that lowest-rate channel in the lowest-rate link;

(c) note any conflicting lowest-rate trail(s) found in step (b) on a list of conflicting trails;

(d) in each successively-higher-rate peer link, from the second-lowest-rate link to the highest-rate link, consider each channel equivalent to or overlapping the channel carrying the deleted trail and unmark it if and only if all equivalent channels in the next-lower-rate link are unmarked;

(e) identify any same-rate trail or trails conflicting with any of the channels considered in step (d) and note it or them on the list of conflicting trails;

(f) repeat steps (a) to (e) for each link of the deleted trail;

(g) carry out the series of tests in steps (h) to (j) to evaluate whether each trail on the conflicting-trails list can have its "in conflict" status removed;

(h) determine for each listed trail whether it is in conflict with another trail or trails (at any rate) in any of its links and, if so, remove it from the list;

(i) determine for each listed trail whether it has endpoint conflicts with another trail or trails (at any rate) and, if so, remove it from the list; and (j) remove the "in conflict" status of each trail remaining on the list.

5. A method for adding or deleting trails on a network in a connection-management domain having peer links in which channels of different rates can be defined, in which, when a trail using a channel of a predetermined rate is added to or deleted from a link, channel-usage information for that link and for all its peer links is updated, and in which deleting a trail from a link comprises the following steps:

(a): unmark the channel in the link of the same data rate as the deleted trail;

(b): for each peer link of lower rate than the deleted trail (if any exist), translate the channel usage into the equivalent channels of the lower-rate link and unmark those lower-rate channels in the lower-rate link;

(c): request a delete ripple check as defined in steps (d) to (g) to update higher-rate peer links (if any exist);

(d): for each link of higher rate than the deleted trail, in order from lowest rate to highest rate, carry out steps (e) to (g);

(e): translate the deleted channel to the equivalent channel in the higher-rate link being checked;

(f): for each link of lower rate than the link being checked, check to see whether all equivalent bandwidth in the lower-rate link is free (unmarked); and (g): if all the equivalent bandwidth in the lower-rate links is free, unmark the channel in the higher-rate link being checked.

6. A method for adding or deleting trails on a network in a connection management domain having peer links in which channels of different rates can be defined, in which, when a trail using a channel of a predetermined rate is added to or deleted from a link, channel-usage information for that link and for all its peer links is updated, and in which deleting a trail from a link comprises the steps of:

(a): translate the channel carrying the deleted trail into equivalent channels at the lowest peer-link rate;

(b): unmark each equivalent lowest-rate channel if no conflicting same-rate trail claims the same channel and no higher-rate trail claims overlapping bandwidth;

(c): note on a list of conflicting trails any conflicting trail(s) found in step (b);

(d): in each successively-higher-rate peer link, from the second-lowest-rate link to the highest-rate link, unmark each channel equivalent to the channel carrying the deleted trail if no conflicting trail claims the channel, no higher-rate trail claims overlapping bandwidth and no lower-rate equivalent channel is marked as used;

(e): note on the list of conflicting trails any conflicting trail(s) found in step (d);

(f): repeat steps (a) to (e) for each link of the deleted trail;

(g): carry out the series of tests in steps (h) to (j) to evaluate whether each trail on the conflicting-trails list can have its "in conflict" status removed;

(h): determine for each listed trail whether it is in conflict with another trail or trails in any of its links and, if so, remove it from the list;

(i): determine for each listed trail whether it has termination point conflicts with another trail or trails and, if so, remove it from the list; and (j) remove the "in conflict" status of each trail remaining on the list.

7. A method for adding or deleting trails on a network in a connection-management domain having peer links in which channels of different rates can be defined, in which, when a trail using a channel of a predetermined rate is added to or deleted from a link, channel-usage information for that link and for all its peer links is updated, and in which deleting a trail from a link comprises the steps of;

(a) if the channel carrying the deleted trail is not in the lowest-rate peer link, translate it into equivalent channels at the lowest peer-link rate;

(b) for each equivalent lowest-rate channel (or for the channel carrying the deleted trail if it is a lowest-rate channel) check for any conflicting same-rate trail claiming the same channel and check for any higher-rate trail claiming overlapping bandwidth (preferably not repeatedly checking each overlapping higher-rate channel) and, if none are found, unmark that lowest-rate channel in the lowest-rate link;

(c) note any conflicting lowest-rate trail(s) found in step (b) on a list of conflicting trails;

(d) in each successively-higher-rate peer link, from the second-lowest-rate link to the highest-rate link, consider each channel equivalent to or overlapping the channel carrying the deleted trail and unmark it if and only if all equivalent channels in the next-lower-rate link are unmarked;

(e) identify any same-rate trail or trails conflicting with any of the channels considered in step (d) and note it or them on the list of conflicting trails;

(f) repeat steps (a) to (e) for each link of the deleted trail;

(g) carry out the series of tests in steps (h) to (j) to evaluate whether each trail on the conflicting-trails list can have its "in conflict" status removed;

(h) determine for each listed trail whether it is in conflict with another trail or trails (at any rate) in any of its links and, if so, remove it from the list;

(i) determine for each listed trail whether it has endpoint conflicts with another trail or trails (at any rate) and, if so, remove it from the list; and (j) remove the "in conflict" status of each trail remaining on the list.

8. A method of determining resource availability in a hierarchical-layered connection-oriented network capable of supporting a variety of lower level client trails within higher level server trails, the method comprising:

detecting the provisioning of a server trail between a plurality of trail termination points each having respective adaptation capabilities;

determining adaptation capabilities common to each of the plurality of termination points, determining at least two client trails that may possibly be provisioned within the server trail on the basis of the common adaptation capabilities, the network being incapable of supporting more than one of said at least two client trails simultaneously;

generating data records representing each of said at least two client trails;

detecting the provisioning of a first of said at least two client trails; and in response, storing data in said data records indicating the unavailability of the others of said at least two client trails.

9. A method according to claim 8, wherein the determined at least two client trails comprise all possible client trails that may be provisioned within the server trail on the basis of the common adaptation capabilities of the plurality of termination points.

10. A method of managing the provisioning of trails in a hierarchical-layered connection-oriented network capable of supporting a variety of lower level client trails within higher level server trails, the method comprising performing the method of determining resource availability of claim 8.

11. A computer program arranged to perform the method of claim 8.

12. A computer readable storage medium having the computer program of claim 11 recorded thereon.

13. A method according to claim 8 in which when a channel for a trail is added, if a conflict with another trail arises, both trails are marked "in conflict".

14. A method according to claim 13 in which, the trail with which conflict arises is a network-learnt trail.

15. A method according to claim 13 in which, when a channel for a trail is deleted, if a trail marked "in conflict" is found to be no longer in conflict, the "in conflict" marking is removed.

16. A trail manager for managing the provisioning of trails in a hierarchical-layered connection-oriented network capable of supporting a variety of lower level client trails within higher level server trails, the trail manager being arranged to:

detect the provisioning of a server trail been a plurality of trail termination points each having respective adaptation capabilities;

determine adaptation capabilities common to each of the plurality of termination points, determine at least two client trails that may possibly be provisioned within the server trail on the basis of the common adaptation capabilities, the network being incapable of supporting more than one of said at least two client trails simultaneously;

generate data records representing each of said at least two client trails;

detect the provisioning of a first of said at least two client trails; and in response, store data in said data records indicating the unavailability of the others of said at least two client trails.

17. A data network comprising the trail manager of claim 16.

18. A trail manager according to claim 16 in which the update-channel means marks as "in conflict" any trails found to be in conflict when a trail is added.

19. A trail manager according to claim 18 in which the update-channel means removes an "in conflict" marking from a trail if it is found to be no longer in conflict after another trail is deleted.

* * * * *